United States Patent
Ryu et al.

(10) Patent No.: US 12,228,660 B2
(45) Date of Patent: Feb. 18, 2025

(54) POSITION MEASURING DEVICE

(71) Applicant: AMOSENSE CO., LTD, Cheonan-si (KR)

(72) Inventors: Kyung Hyun Ryu, Cheonan-si (KR); Seung Yeob Yi, Cheonan-si (KR); Hyung Il Baek, Cheonan-si (KR); Jae Il Park, Cheonan-si (KR); Chan Woo Lee, Cheonan-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 727 days.

(21) Appl. No.: 17/606,278

(22) PCT Filed: Apr. 24, 2020

(86) PCT No.: PCT/KR2020/005463
§ 371 (c)(1),
(2) Date: Oct. 25, 2021

(87) PCT Pub. No.: WO2020/218889
PCT Pub. Date: Oct. 29, 2020

(65) Prior Publication Data
US 2022/0214419 A1     Jul. 7, 2022

(30) Foreign Application Priority Data

Apr. 26, 2019  (KR) .................. 10-2019-0049345

(51) Int. Cl.
*G01S 3/72*    (2006.01)
*G01S 1/20*    (2006.01)
(Continued)

(52) U.S. Cl.
CPC ...... *G01S 3/72* (2013.01); *G01S 1/20* (2013.01); *H01Q 5/25* (2015.01); *H04W 4/023* (2013.01); *H04W 4/40* (2018.02)

(58) Field of Classification Search
CPC ..... G01S 3/72; G01S 1/20; H01Q 5/25; H04W 4/023; H04W 4/40
(Continued)

(56) References Cited

U.S. PATENT DOCUMENTS

| | | |
|---|---|---|
| 5,614,914 A | 3/1997 | Bolgiano et al. |
| 8,781,420 B2 | 7/2014 | Schlub et al. |

(Continued)

FOREIGN PATENT DOCUMENTS

| | | |
|---|---|---|
| CN | 102043151 A | 5/2011 |
| CN | 103339796 A | 10/2013 |

(Continued)

OTHER PUBLICATIONS

CN Office Action dated Mar. 1, 2024 as received in Application No. 202080040485.0.
(Continued)

*Primary Examiner* — Bo Fan
(74) *Attorney, Agent, or Firm* — Maschoff Brennan

(57) ABSTRACT

Proposed is a position measuring device configured to measure a position (distance) by combining a TWR positioning method and a PDOA positioning method. The proposed position measuring device: outputs positioning signals at set time intervals; receives response signals for the positioning signals; measures the distance between a plurality of diversity antennas and an object on the basis of the respective positioning signals and response signals transmitted and received by the diversity antennas; and measures the distance to the object on the basis of the measurement values of the distances between the plurality of diversity antennas and the object.

13 Claims, 11 Drawing Sheets

(51) Int. Cl.
*H01Q 5/25* (2015.01)
*H04W 4/02* (2018.01)
*H04W 4/40* (2018.01)

(58) Field of Classification Search
USPC ...................................... 342/378, 374, 51, 5
See application file for complete search history.

(56) References Cited

U.S. PATENT DOCUMENTS

| 9,281,562 | B2 | 3/2016 | Karkinen et al. |
| 2005/0068225 | A1 | 3/2005 | Inoue et al. |
| 2020/0041603 | A1 | 2/2020 | Stephens et al. |
| 2020/0067341 | A1* | 2/2020 | Glover .................... H02J 50/80 |

FOREIGN PATENT DOCUMENTS

| CN | 103636061 A | 3/2014 |
| CN | 108351400 A | 7/2018 |
| JP | 2005-014249 A | 1/2005 |
| JP | 2006-042323 A | 2/2006 |
| KR | 10-2008-0028532 A | 4/2008 |
| KR | 20-2014-0003348 U | 6/2014 |
| KR | 10-2019-0026098 A | 3/2019 |

OTHER PUBLICATIONS

CN office action issued in application No. 202080040485.0 dated May 24, 2023.
CN Office Action dated Oct. 12, 2023 as received in Application No. 202080040485.0.

* cited by examiner

[FIG. 1]
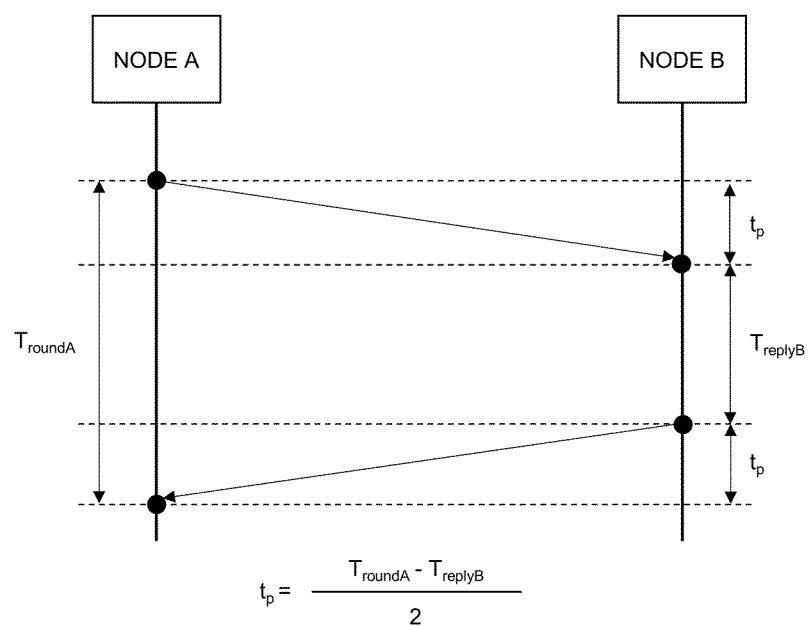

[FIG. 2]
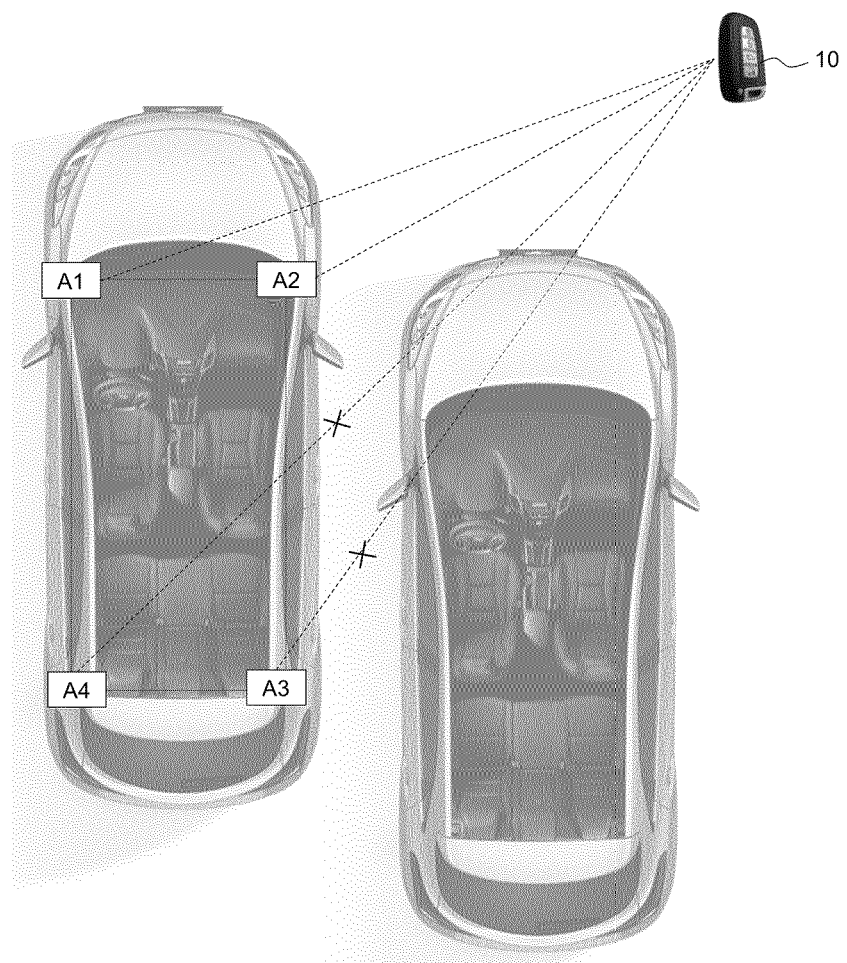

[FIG. 3]
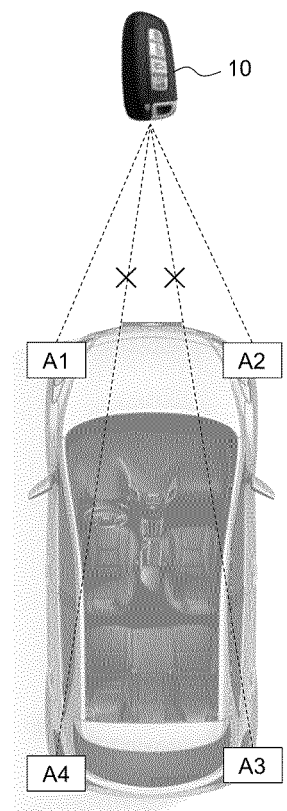

[Fig. 4]
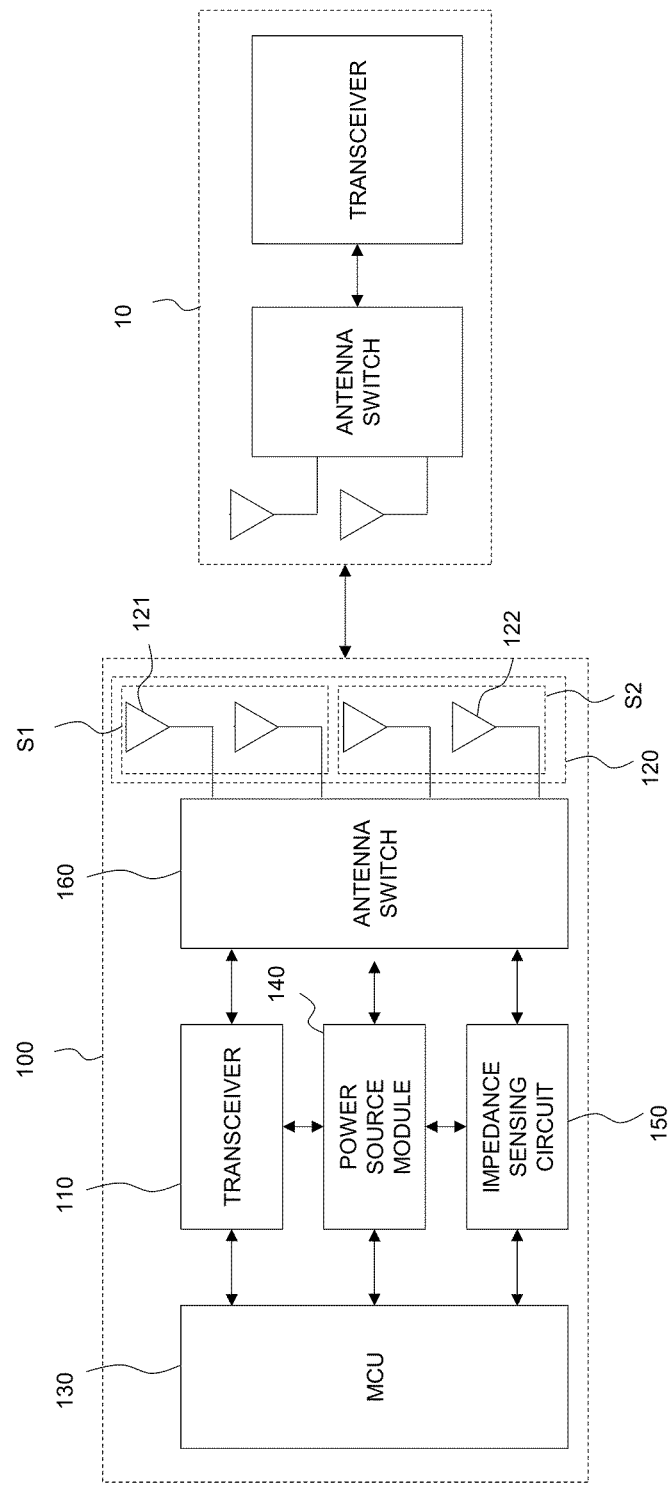

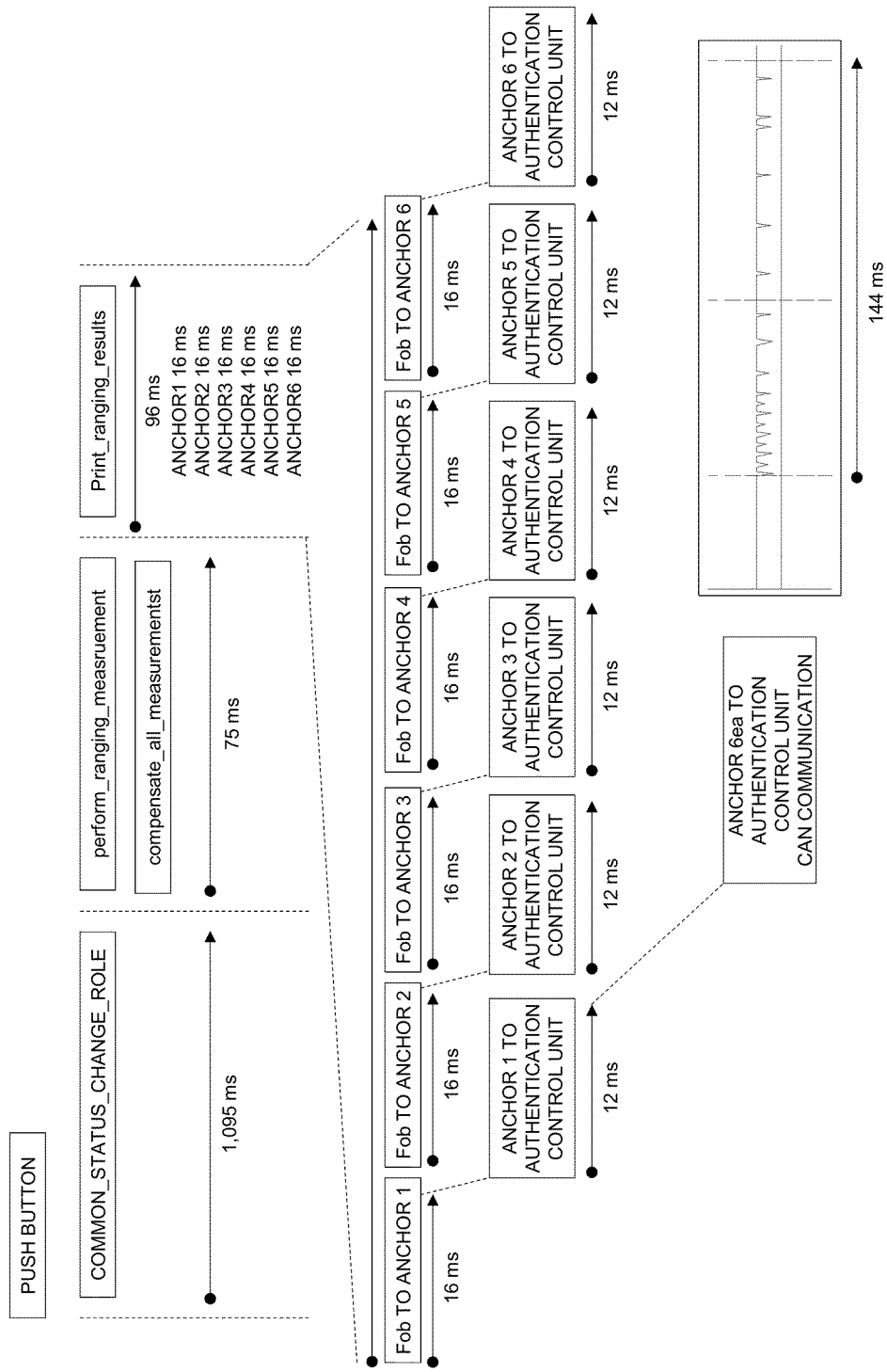
[Fig. 5]

[Fig. 6]

|  | GRIPPED BY HAND | FRONT POCKET | BACK POCKET | SIDE SURFACE |
|---|---|---|---|---|
| GROUP DELAY (ns) | 0.6 | 0.03 | 0.56 | 0.25 |
| DISTANCE(m) | 0.37 | 0.03 | 0.32 | 0.03 |
| RSSI(dBm) | -7.58 | -2.25 | -13.71 | -0.07 |

[Fig. 7]

| GROUP DELAY (ns) (@6.5GHz) | FREE SPACE | STATE OF BEING INSERTED INTO HUMAN BODY | |
| --- | --- | --- | --- |
| | | BEFORE TUNING OF TRIMMER CAPACITOR | AFTER TUNING OF TRIMMER CAPACITOR |
| | 1.51 | 2.42 | 2.34 |

[FIG. 8]
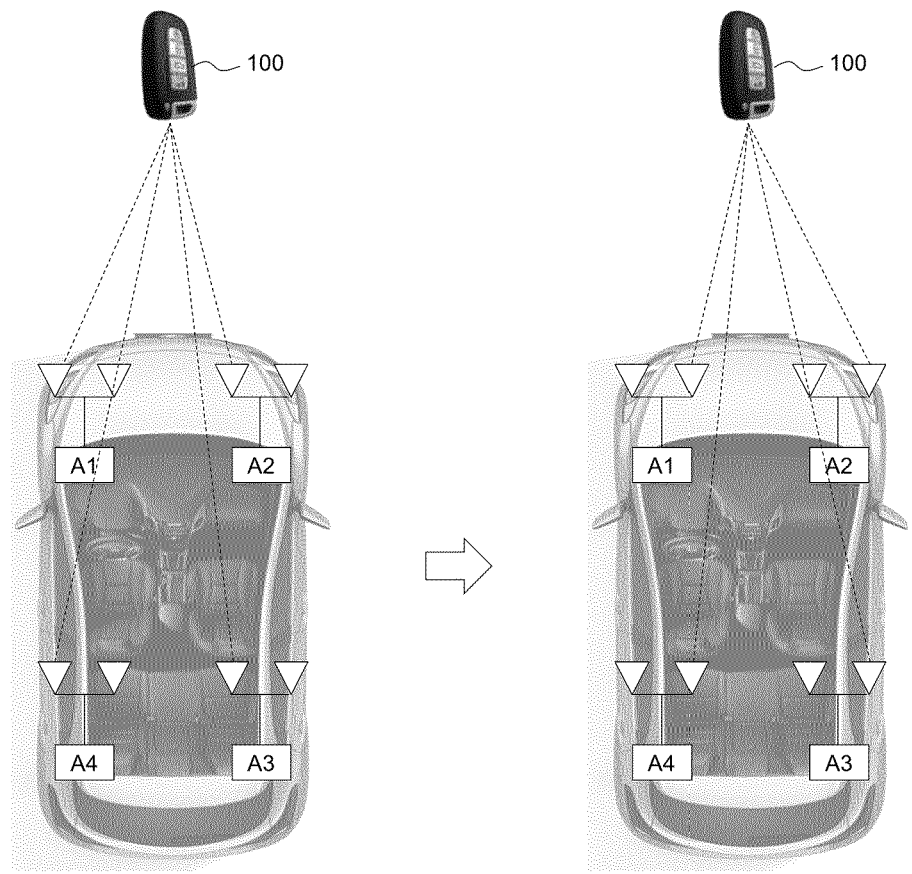

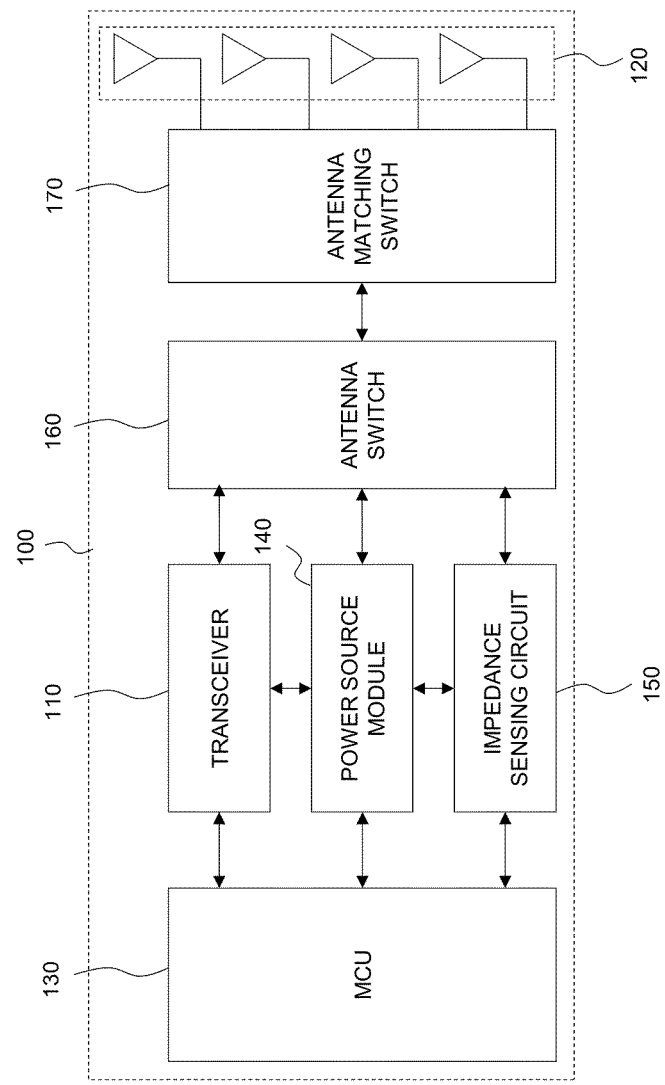
[Fig. 9]

[Fig. 10]
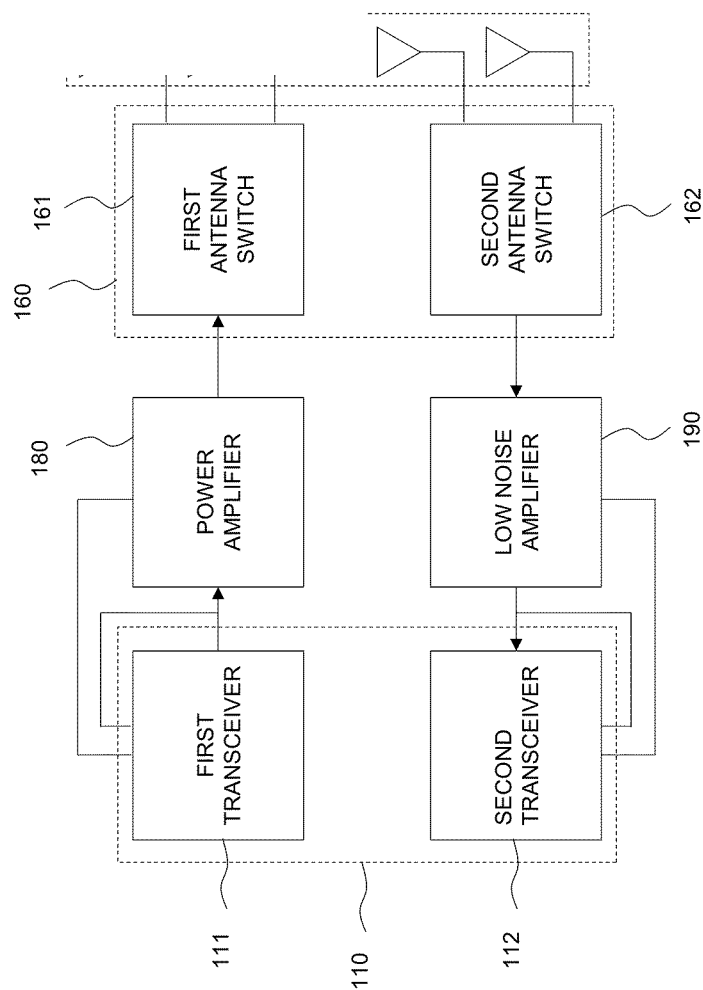
[FIG. 11]
| IN THE AIR | | |
|---|---|---|
| PERMITTIVITY(e0) | 8.85E-12 | F/cm |
| PERMEABILITY(u0) | 1.25664E-06 | H/m |
| SPEED OF LIGHT(c) | 3.00E-08 | m/s |
| WAVELENGTH(Lamda) | 6.17E+00 | mm |

[FIG. 12]

|  | HUMAN |  |
|---|---|---|
| PERMITTIVITY | 55.9 | F/cm |
| PERMEABILITY | 0.999991 | H/m |
| THICKNESS | 20 | Mm |

POSITION MEASURING DEVICE

TECHNICAL FIELD

The present disclosure relates to a position measuring device, and more specifically, to a position measuring device that measures a distance between a vehicle and a driver, a vehicle position, and a driver position using an ultra-wide band (UWB) communication.

BACKGROUND ART

Recently, a vehicle provides various conveniences to a driver using a distance between the driver and the vehicle, a driver position, a vehicle position, etc. For example, the vehicle provides a function of guiding a path to a parked vehicle to the driver using the driver position and the vehicle position, a function of opening a door of the vehicle when the driver approaches the vehicle and locking the door of the vehicle when the driver moves away from the vehicle using a distance between the driver and the vehicle, etc.

A conventional vehicle has used a low frequency (LF) or radio frequency (RF) communication to measure the distance between the driver and the vehicle, the driver position, and the vehicle position.

Recently, a position measuring technology using an ultra-wide band (UWB) communication is being applied to the vehicle. The UWB communication can provide wireless positioning and communication functions having high precision through an impulse signal. The UWB communication uses a frequency band of about 3.1 GHz to 10.6 GHz and has a transmission distance of about 10 m to 1 km. The UWB communication is advantageous for distance measurement due to its excellent time resolution with several nsec pulses, and can implement a low power of a low duty cycle.

Therefore, the UWB communication is applied to the position measuring field required for low-speed position recognition-based application services and the position measuring field having the precision of about +/−10 cm.

However, the position measuring technology using the UWB communication uses a Two Way Ranging (TWR) positioning method for measuring a position (distance) using a transmission time of a positioning signal and a reception time of a response signal to the positioning signal, resulting in positioning errors and deviations due to obstacles. In other words, in an indoor environment in which a multi-path is a problem due to obstacles, a time difference of several milliseconds can also cause a serious error of 100 m or more, or measurement errors and deviations can occur due to a group delay or a path loss caused by a signal to metal parts in the vehicle or a human body.

DISCLOSURE

Technical Problem

The present disclosure is proposed to solve the conventional problems associated with the related art, and an object of the present disclosure is to provide a position measuring device that measures a position (distance) by combining a TWR positioning method and a PDOA positioning method.

Technical Solution

To achieve the object, a position measuring device according to an exemplary embodiment of the present disclosure includes a communication transceiver configured to generate a positioning signal at a set time interval, a plurality of diversity antennas configured to obtain and output the positioning signal generated by the communication transceiver, and to receive a response signal to the positioning signal, and a microcontroller configured to measure a distance between the diversity antenna and an object based on the positioning signal and the response signal transmitted and received by the plurality of diversity antennas, respectively and to measure a distance to the object based on a distance measurement value between the plurality of diversity antennas and the object.

The plurality of diversity antennas includes two or more directional antennas and two or more omni directional antennas, in which the two or more directional antennas constitute a first antenna set, and the two or more omni directional antennas constitute a second antenna set.

The microcontroller can measure a distance between the diversity antenna and the object based on reception times of the positioning signal and the response signal, or measure a distance between the diversity antenna and the object based on phases of the positioning signal and the response signal.

The position measuring device according to the exemplary embodiment of the present disclosure can further include an impedance sensing circuit configured to sense an amount of impedance changed, in which the microcontroller can compensate for the distance measurement value based on the amount of impedance changed.

The position measuring device according to the exemplary embodiment of the present disclosure can further include an antenna switch switches a diversity antenna to one of a plurality of matching circuits, in which the antenna switch can switch the diversity antenna to one of the plurality of matching circuits based on the amount of impedance changed.

The position measuring device according to the exemplary embodiment of the present disclosure can further include a trimmer capacitor configured to adjust a capacitance value of the plurality of diversity antennas.

The microcontroller can communicate with a plurality of anchors installed on the object, and primarily measure a distance to the object by communicating one of a pair of antennas connected to the anchor, secondarily measure a distance to the object by communicating with the other one of the pair of antennas connected to the anchor, and detect, as the distance to the object, an average of measurement values obtained by repeating the primary measurement and the secondary measurement a plurality of times. The microcontroller can also detect the distance to the object by calculating a Gaussian distribution after repeating the primary measurement and the secondary measurement the plurality of times.

The position measuring device according to the exemplary embodiment of the present disclosure can further include an antenna matching switch configured to adjust antenna matching values of the plurality of diversity antennas.

The transceiver can include a first transceiver constituting a transmission signal path and a second transceiver constituting a reception signal path, and the antenna switch can include a first antenna switch constituting the transmission signal path and a second antenna switch constituting the reception signal path. The position measuring device according to the exemplary embodiment of the present disclosure can further include a power amplifier connecting the first transceiver and the first antenna switch and a low noise amplifier connecting the second transceiver and the second antenna switch.

Advantageous Effects

The position measuring device according to the present disclosure, it is possible to measure the position (distance) by combining the TWR positioning method and the PDOA positioning method, thereby preventing the measurement errors and deviations due to the signal to the metal parts in the vehicle or the human body.

Further, the position measuring device can measure the position (distance) by combining the TWR positioning method and the PDOA positioning method to prevent the occurrence of the errors and the deviations, thereby preciously measuring the driver position, the vehicle position, and the distance between the driver and the vehicle.

DESCRIPTION OF DRAWINGS

FIGS. 1 to 3 are diagrams for explaining a conventional TWR positioning method.

FIG. 4 is a diagram for explaining a position measuring device according to an exemplary embodiment of the present disclosure.

FIG. 5 is a diagram for explaining a time taken by the position measuring device according to the exemplary embodiment of the present disclosure to calculate a relative distance between a key fob and the vehicle.

FIG. 6 is a diagram for explaining signal characteristics due to the presence of the human influence between the key fob and the vehicle.

FIG. 7 is a diagram for explaining performance improvement according to the antenna pattern and matching tuning of the position measuring device according to the exemplary embodiment of the present disclosure.

FIG. 8 is a diagram for explaining the performance improvement of the position measuring device according to the exemplary embodiment of the present disclosure through an anchor and tag diversity method.

FIG. 9 is a diagram for explaining position compensation using the TWR and RSSI of the position measuring device according to the exemplary embodiment of the present disclosure.

FIGS. 10 to 12 are diagrams for explaining position compensation through the separation of the signal line of the position measuring device according to the exemplary embodiment of the present disclosure.

MODE FOR INVENTION

Hereinafter, the most preferred exemplary embodiments of the present disclosure will be described with reference to the accompanying drawings in order to specifically describe the exemplary embodiments such that those skilled in the art to which the present disclosure pertains may easily implement the technical spirit of the present disclosure. First, in adding reference numerals to the components of each drawing, it should be noted that the same components have the same reference numerals as much as possible even if they are illustrated in different drawings. Further, in describing the present disclosure, when it is determined that the detailed description of the related well-known configuration or function may obscure the gist of the present disclosure, the detailed description thereof will be omitted.

Referring to FIG. 1, a position measuring technology using an ultra-wide band (UWB) communication generally measures a position or a distance using a two way ranging (TWR or TOA) positioning method.

The TWR positioning method is a method for measuring a distance between two nodes using a round trip time (RTT) of a wireless communication signal. The TWR positioning method is a technique suitable for a group cooperative positioning system because it does not require visual synchronization of a wireless communication network and can simultaneously perform bidirectional wireless communication and distance measurement.

However, there is a problem in that the TWR positioning method has positioning errors and deviations due to obstacles because it measures the position (distance) using a transmission time of a positioning signal and a reception time of a response signal to the positioning signal.

In other words, for a measurement value obtained by the TWR positioning method, there is a problem in that a distance measurement value between a node and a node is estimated longer than an actual measurement value due to factors such as obstacles. In an indoor environment in which a multi-path is a problem due to obstacles, a time difference of several milliseconds can also cause a serious error of 100 m or more, or measurement errors and deviations can occur due to a group delay or a path loss caused by a signal to metal parts in the vehicle or a human body.

For example, referring to FIG. 2, the TWR positioning method can perform the normal measurement between anchors (A1 and A2) and a tag (key fob) 10, but in anchors (A3 and A4) where other vehicles exist between the tag 10 and the vehicle, a group delay or a path loss due to metal parts of other vehicles occurs, thereby causing measurement errors and deviations.

For another example, referring to FIG. 3, the TWR positioning method can perform the normal measurement between the anchor (A1 and A2) and the tag 10, but in the anchors (A3 and A4, the group delay or the path loss occurs due to the metal parts in the vehicle, thereby causing the measurement errors and deviations between the tag 10 and the anchors (A3 and A4).

As described above, in the TWR positioning method, there is a problem in that there occur the group delay and the loss of the signal due to the metal parts in the vehicle in a certain direction as in a case where there are other vehicles between the human and the vehicle, the human body influence as in a case where there is the FOB in the back pocket of the human, and the positioning errors and deviations due to a multi-path fading.

Generally, since the errors occurring in the TWR positioning method are not reduced unlike the general noises, the position measuring device according to the exemplary embodiment of the present disclosure solves the problem occurring upon the positioning by the TWR positioning method through the positioning method that combines the TWR positioning method and the PDOA positioning method.

The position measuring device according to the exemplary embodiment of the present disclosure measures the driver position, the vehicle position, and the distance between the driver and the vehicle through the positioning method that combines the TWR positioning method and the PDOA positioning method.

The position measuring device obtains a first distance measurement value using the TWR positioning method, and obtains a second distance measurement value using the PDOA positioning method. The position measuring device measures a position (distance) of an object using the first distance measurement value and the second distance measurement value.

The position measuring device obtains a distance from a current position (position of the position measuring device) measured using the TWR positioning method to the object as the first distance measurement value. The position measuring device obtains a distance from the current position (position of the position measuring device) measured using the PDOA positioning method to the object as the second distance measurement value.

The position measuring device measures the position (distance) using the TWR positioning result and the PDOA positioning result. At this time, the position measuring device measures the position (distance) by detecting one of the first distance measurement value that is the TWR positioning result and the second distance measurement value that is the PDOA positioning result depending upon surrounding environments, or measures the position (distance) using an average of the first distance measurement value and the second distance measurement value.

Referring to FIG. 4, a position measuring device 100 according to the exemplary embodiment of the present disclosure is configured to include a communication transceiver 110, a plurality of diversity antennas 120, a microcontroller (MCU) 130, and a power source module 140.

The communication transceiver 110 outputs a positioning signal at a regular time interval. The communication transceiver 110 generates the positioning signal at a set time interval to output it to the plurality of diversity antennas 120.

The plurality of diversity antennas 120 receive the positioning signal output from the communication transceiver 110, and output the received positioning signal to the outside. The plurality of diversity antennas 120 receive a response signal to the positioning signal to transmit it to the microcontroller 130.

The plurality of diversity antennas 120 are composed of a directional antenna 121 and an omni directional antenna 122 to remove a reduction in performance due to the human body influence. The position measuring device 100 can constitute the antennas with the directional antenna 121 and the omni directional antenna 122, thereby minimizing the human body influence due to a high gain antenna and directionality.

The plurality of diversity antennas 120 include two or more directional diversity antennas 121 and two or more omni directional diversity antennas 122, and constitutes a pair of antenna sets. At this time, the plurality of diversity antennas 120 are composed of a first antenna set (S1) composed of two or more directional diversity antennas 121 and a second antenna set (S2) composed of two or more omni directional diversity antennas 122.

The microcontroller (MCU) 130 measures the distance between the vehicle and the driver using the reception times or phases of the signals transmitted or received by the plurality of diversity antennas 120. In other words, the microcontroller 130 measures the distance between the vehicle and the driver based on the positioning signal and a reception time of the response signal. The microcontroller 130 can also measure the distance between the vehicle and the driver based on the positioning signal and a phase of the response signal.

The microcontroller 130 compares the measured distance values to select an optimal value as distance data. The microcontroller 130 calculates an optimal measurement value from a distribution chart in consideration of a plurality of measurement values and environmental conditions. The microcontroller 130 adopts an accurate distance data extraction algorithm through the repeated measurement. At this time, the distance data extraction algorithm is a process of summing or subtracting a compensation value to and from the measurement result (distance) as a compensation concept.

The power source module 140 supplies a power source to the transceiver 110, the plurality of diversity antennas 120, and the microcontroller 130.

The position measuring device 100 can also measure the position (distance) interchangeably using an RSSI measuring method. In other words, the position measuring device 100 measures the position (distance) interchangeably using the RSSI measuring method together with the TWR positioning and the PDOA positioning to secure the position measurement accuracy.

To this end, the position measuring device 100 can further include an impedance sensing circuit 150. The impedance sensing circuit 150 senses an amount of impedance changed. The microcontroller 130 compensates for the measurement value based on the amount of impedance changed sensed by the impedance sensing circuit.

For example, in case of covering the tag 10 (i.e., key fob, antenna) with the hand, or sitting on the smartphone with the driver's butt in the vehicle, the impedance can be changed, thereby causing the error in the distance value. Therefore, the position measuring device 100 senses the change in impedance through the impedance sensing circuit 150, and compensates for the distance value depending upon the sensed amount of impedance changed.

The position measuring device 100 further includes an antenna switch 160, and can switch the antenna switch 160 depending upon the amount of impedance changed to switch an antenna matching value.

The antenna switch 160 constitutes a plurality of matching circuits having different characteristics (LC). The antenna switch 160 switches the antenna to an appropriate matching circuit depending upon the amount of impedance changed sensed by the impedance sensing circuit 150.

Meanwhile, the position measuring device 100 can also include a sensor configured to sense the key fob covered by the driver when installed on the key fob. The position measuring device 100 compensates for the distance value or adjusts the output power when it is determined that the driver covers the key based on the sensed result of the sensor.

Referring to FIG. 5, a time required for receiving distance data other than a communication status change role (COMMON_STATUS_CHANGE_ROLE) portion between the key fob, the anchor, and an authentication control unit (BLE main module) is about 171 ms, and an estimation time required for operating the position positioning of the authentication control unit is about 150 to 250 ms.

Therefore, a time required for calculating the relative distance between the key fob and the vehicle in the microcontroller (MCU or BLE) 130 of the position measuring device 100 can be calculated by summing the distance measurement time (171 ms) and the estimation time required for operating the position positioning (150 to 250 ms). At this time, it can be seen that since the distance measurement time is 171 ms, and the estimation time required for operating the position positioning is 150 to 250 ms, the time required for calculating the relative distance between the key fob and the vehicle is about 320 to 420 ms.

Referring to FIG. 6, the position measuring device 100 shows the trend that the increases in the group delay (passive) and the distance (active) are proportional if there is the human body influence between the key fob and the vehicle. In other words, in a case where the human grips the key fob with the hand or puts it in the back pocket, a reception signal strength (RSSI) is reduced compared to a case where there is no human body influence between the key fob and the vehicle, thereby increasing the group delay and the distance.

Referring to FIG. 7, the position measuring device 100 can improve the group delay through the antenna and the matching tuning. At this time, the position measuring device 100 adjusts a capacitance value through a trimmer capacitor, etc. for the antenna and the matching tuning, thereby improving the group delay.

The position measuring device 100 can improve the distance measurement performance through an anchor and tag diversity method. For example, referring to FIG. 8, the anchors (A1 to A4) are installed in the vehicle, and each anchor has a pair of antennas (i.e., a first antenna (n−1) and a second antenna (n−2)) disposed to be spaced apart from each other at regular intervals not to interfere with each other. The position measuring device 100 primarily measures the distance using the first antennas 1-1, 2-1, 3-1, 4-1 of the anchors installed in the vehicle, and then secondarily measures the distance using the second antennas 1-2, 2-2, 3-2, 4-2 of the anchors installed in the vehicle. The position measuring device 100 repeats the primary measurement and the secondary measurement a plurality of times (e.g., about 20 times), and then detects tag coordinates and distance values by calculating an average value or a Gaussian distribution.

Referring to FIG. 9, the position measuring device 100 further includes an antenna matching switch 170, and can compensate for the position through the TWR positioning method and the RSSI positioning method.

The position measuring device 100 compares the measurement value measured by two diversity antennas to select an optimal value as the distance measurement value. At this time, the position measuring device 100 can calculate the distance measurement value using a temporal diversity antenna and an RF switch, or calculate the distance measurement value using the measurement value measured by a spatial diversity antenna and a combiner. The position measuring device 100 calculates the optimal value from the distribution chart considering multiple measurements and environmental conditions.

The position measuring device 100 detects the accurate position by detecting the accurate distance measurement value through the repeated measurement, detecting the distance measurement value interchangeably using the directional antenna 121 and the omni directional antenna 122, and detecting the distance measurement value by adjusting an optimal antenna matching value using the antenna switch 160 and the antenna matching switch 170.

Referring to FIG. 10, the position measuring device 100 can separate an RF reception (RX) signal path and an RF transmission (TX) signal path, and then analyze and process the signals through an ADC port with a signal MCU embedded therein.

In other words, the position measuring device 100 generates the RF transmission (TX) signal path that outputs the positioning signal through a first transceiver 111 and a first antenna switch 161, and generates the RF reception (RX) signal path that receives the response signal to the positioning signal through a second transceiver 112 and a second antenna switch 162.

At this time, the position measuring device 100 connects a power amplifier (PA) 180 between the first transceiver 111 and the first antenna switch 161 that constitute the RF transmission signal path, and connects a low noise amplifier (LNA) 190 between the second transceiver 112 and the second antenna switch 162 that constitute the RF reception signal path. Therefore, the position measuring device 100 compensates for the positioning signal and the response signal that are the RF signals.

Equation 1 below is a formula for calculating a medium loss in a case where there is a medium between the object upon position measurement and the position measuring device 100.

$$P_R[\text{dBm}]=P_T[\text{dBm}]+G[\text{dB}]-L[\text{dB}]-20\log_{10}(4\pi f_c(d_1+d_2)/c)-L_{MATERIAL}[\text{dB}] \qquad \text{Equation 1}$$

where $P_r$ refers to a reception power, $P_t$ refers to a transmission power, G refers to an antenna gain, L refers to a power loss, $F_c$ refers to a center frequency, $d_1$ and $d_2$ refer to distances between transmission and reception antennas and an intermediate medium ($d_1$ refers to the distance between the first antenna and the intermediate medium and $d_2$ refers to the distance between the second antenna and the intermediate medium), and $L_{material}$ refers to a power loss of the intermediate medium between the antenna and the antenna.

For example, as shown in FIGS. 11 and 12, it is assumed that a permittivity ($e_0$), a permeability ($u_0$), a speed of light (c), and a wavelength (Lamda) in the air are defined, the thickness of the hand is about 20 mm, and the permittivity and permeability of the hand are about 55.9 F/cm, and about 0.999991 H/m, respectively.

At this time, when the tag (key fob) or the anchor is covered by the hand, the loss ($L_{material}$) due to the human hand can be calculated by substituting each of the aforementioned factors into Equation 1, and it can be seen that the loss of about 32 dB occurs as a result of the calculation. At this time, when the low noise amplifier of about 20 dB is applied, the loss can be reduced to about 12 dB, thereby improving (compensating) the distance measurement value.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:
1. A position measuring device comprising:
   a communication transceiver configured to generate a positioning signal at a set time interval;
   an impedance sensing circuit configured to sense an amount of impedance changed;
   a plurality of diversity antennas configured to obtain and output the positioning signal generated by the communication transceiver, and to receive a response signal to the positioning signal; and
   a microcontroller configured to measure a distance between the diversity antenna and an object based on the positioning signal and the response signal transmitted and received by the plurality of diversity antennas, respectively and to measure a distance to the object based on a distance measurement value between the plurality of diversity antennas and the object,
   wherein the microcontroller compensates for the distance measured value based on the amount of impedance changed.
2. The position measuring device of claim 1,
   wherein the plurality of diversity antennas comprise: two or more directional antennas and two or more omni directional antennas.

3. The position measuring device of claim 2,
wherein the two or more directional antennas constitute a first antenna set, and the two or more omni directional antennas constitute a second antenna set.

4. The position measuring device of claim 1,
wherein the microcontroller measures a distance between the diversity antenna and the object based on reception times of the positioning signal and the response signal.

5. The position measuring device of claim 1,
wherein the microcontroller measures a distance between the diversity antenna and the object based on phases of the positioning signal and the response signal.

6. The position measuring device of claim 1, further comprising: an antenna switch switches the diversity antenna to one of a plurality of matching circuits,
wherein the antenna switch switches the diversity antenna to one of the plurality of matching circuits based on the amount of impedance changed.

7. The position measuring device of claim 1, further comprising: a trimmer capacitor configured to adjust a capacitance value of the diversity antenna.

8. The position measuring device of claim 1,
wherein the microcontroller communicates with a plurality of anchors installed on the object, and primarily measures a distance to the object by communicating one of a pair of antennas connected to the anchor, and secondarily measures a distance to the object by communicating with the other one of the pair of antennas connected to the anchor.

9. The position measuring device of claim 8,
wherein the microcontroller detects, as the distance to the object, an average of measurement values obtained by repeating the primary measurement and the secondary measurement a plurality of times.

10. The position measuring device of claim 8,
wherein the microcontroller detects the distance to the object by calculating a Gaussian distribution after repeating the primary measurement and the secondary measurement the plurality of times.

11. The position measuring device of claim 1, further comprising: an antenna matching switch configured to adjust antenna matching values of the plurality of diversity antennas.

12. The position measuring device of claim 1,
wherein the transceiver comprises: a first transceiver constituting a transmission signal path and a second transceiver constituting a reception signal path, and
wherein the antenna switch comprises: a first antenna switch constituting the transmission signal path and a second antenna switch constituting the reception signal path.

13. The position measuring device of claim 12, further comprising: a power amplifier connecting the first transceiver and the first antenna switch; and
a low noise amplifier connecting the second transceiver and the second antenna switch.

* * * * *